United States Patent
Simmons et al.

(10) Patent No.: US 6,688,776 B2
(45) Date of Patent: Feb. 10, 2004

(54) INTERCONNECT DEVICE

(75) Inventors: Richard L. Simmons, Leander, TX (US); Curtis L. Shoemaker, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/121,910

(22) Filed: Apr. 12, 2002

(65) Prior Publication Data

US 2003/0194187 A1 Oct. 16, 2003

(51) Int. Cl.$^7$ .................................................. G02B 6/36
(52) U.S. Cl. ........................................ 385/53; 174/72 A
(58) Field of Search ........................... 174/72 A; 385/53, 385/55, 58, 60, 76–78

(56) References Cited

U.S. PATENT DOCUMENTS

| | | |
|---|---|---|
| 4,871,227 A | 10/1989 | Tilse |
| 5,102,212 A | 4/1992 | Patterson |
| 5,204,925 A | 4/1993 | Bonanni et al. |
| 5,943,455 A | 8/1999 | Travieso et al. |
| 6,181,863 B1 | 1/2001 | Engberg et al. |
| 6,282,360 B1 | 8/2001 | Milanowski et al. |
| 6,312,046 B1 * | 11/2001 | Sora et al. .................. 296/208 |
| 6,312,278 B1 * | 11/2001 | Prior .......................... 439/371 |
| 6,327,414 B1 | 12/2001 | Strause et al. |

FOREIGN PATENT DOCUMENTS

| | | |
|---|---|---|
| DE | 198 42 041 A1 | 3/1999 |
| EP | 0 305 058 | 3/1989 |
| EP | 0 438 898 A1 | 7/1991 |
| FR | 1.271.176 * | 12/1960 |

OTHER PUBLICATIONS

Boedeker Plastics, Inc., "UL 94 Overview: Test for Flammability of Plastic Materials for Parts in Devices and Appliances," Boedeker.com, 2002, pp. 1–5, Shiner, Texas.
GE Structured Products, "Flame–Retardant Film," gestructureproducts.com, 2002, pp. 1 and 2.
GE Structured Products, "Lexan Product Data Sheet," gestructureproducts.com, 2002, pp. 1 and 2.
Bussi, Philippe, "Kynar® Films Novel PVDF Multilayer Blown Films," *MBS Specialty Plastic Films*, 2001, Oct. 24–26, 2001—Düsseldorf.

* cited by examiner

*Primary Examiner*—Khiem Nguyen
(74) *Attorney, Agent, or Firm*—Yen Tong Florczek

(57) ABSTRACT

The invention pertains to a mechanical device useful for distributing, routing, and managing fibers, such as optical fibers. The device is particularly useful applications such as computers and telecommunication equipment. In one embodiment, the inventive device comprising conductors and a flexible substrate. The flexible substrate has (a) a central body having at least one input end where the conductors enter; (b) a plurality of primary tabs extending from the central body, each tab having at least one means for retaining the conductors; and (c) a passageway formed from folding the device along a plurality of folding slots such that a plurality of locking features mate with a plurality of interlocking slots and the primary tabs, the conductors disposed inside at least a portion of the passageway. The device manages, routes, and distributes conductors without the use of an adhesive.

26 Claims, 5 Drawing Sheets

INTERCONNECT DEVICE

TECHNICAL FIELD

The present invention pertains generally to a device capable of distributing, routing and managing a plurality of conductors such as optical fibers and metal wires, and more particular, to a mechanical device that does not rely on the use of adhesives to distribute and manage the conductors. The inventive device finds use in integrated printed circuit boards assemblies, among other applications.

BACKGROUND

Today, many applications contain printed circuit boards (PCB) that integrate optical and electrical components to increase the data transmission and storage capabilities. Such applications include, e.g., computers and telecommunications (in door and outdoor). On the optical side, typically several optical fibers from four to thirty-two or more, are used raising fiber management issues. To complicate the matter, the numerous optical fibers usually also need to be distributed and routed to a specific location on the PCB. Some skilled in the art have tried to address these issues.

For example, U.S. Pat. No. 5,204,925 (Bonnani et al.) discloses an optical interconnection apparatus having a flexible substrate and a plurality of optical fibers mounted on the substrates. The substrate has a main body portion and a plurality of tab portions extending from the body portion. The optical fibers are mounted to the substrate so that each fiber has its end extending between two of the tabs. In this fashion, a fiber distribution network is formed on the substrate. The fibers are mounted by depositing a pressure sensitive adhesive on the flexible substrate and/or on the fiber jacket and then laying down the fiber in a desired pattern. In one embodiment, after the fibers are mounted to the substrate, a cover layer is formed over the fibers and the substrate. In another embodiment, the tab portions are capable of twisting at an angle with respect to the main body. A method of making an optical interconnect apparatus is also disclosed.

As another example, FLEX-FOIL™, a currently commercially available product, contains, in general, optical fibers or copper wires adhesively bonded to a flexible substrate. If desired a cover layer can be disposed on the fibers and the substrate.

The art described above rely on one common feature—the use of an adhesive to bond the optical fibers or copper wires to the substrate. While the adhesive method may be useful, it has some accompanying drawbacks, such as, e.g., nearly permanent placement of the fibers, added processing steps for adhesive bonding, and possible outgassing of volatile organic components in the adhesive due to temperature and humidity effects.

Thus, there is a need for other devices or apparatuses that can manage, distribute, and route conductors, such as optical fibers and copper wires, without the use of an adhesive.

SUMMARY

The present invention provides for a new mechanical device that is capable of managing, distributing, and routing conductors without resorting to the use of an adhesive. The inventive device can be manufactured economically in a streamlined manufacturing process. In general, the inventive device can be constructed by patterning features into a flexible substrate. For example, illustrative features include those that can hold interconnect components, those that allow for folding of the device, those that define the circuit (optical or electrical) routing paths, those that allow for a reservoir of the conductors, and those that allow for safe minimum bend radius of the optical fibers when they are used.

The device can be spatially defined using the Cartesian coordinate system, i.e., a three-dimensional coordinate system in which the coordinates of a point in space are its distances from each of three perpendicular lines (x, y, and z) that intersect at an origin. The x coordinate represents, e.g., the general width of the device while the y coordinate represents the length and the z coordinate represents the thickness. The device is predominantly defined by the plane created by the x and y coordinates because it has minimal thickness.

As used herein, the term "flexible," when used to describe the substrate, means generally that the substrate has the capability of being bent repeatedly without substantial damage to it. In a preferred embodiment, the device has out-of-plane flexibility, that is, out of the x-y plane. The device does have flexibility in-plane.

In one preferred embodiment, the interconnect device comprises conductors and a flexible substrate, the flexible substrate having (a) a central body having at least one input end where the conductors enter; (b) a plurality of primary tabs extending from the central body, each tab having at least one means for retaining the conductors; and (c) a passageway formed from folding the device along a plurality of folding slots such that a plurality of locking features mate with a plurality of interlocking slots and the primary tabs. The conductors disposed inside at least a portion of the passageway. The device manages, routes, and distributes optical fibers without the use of an adhesive.

In another preferred embodiment, the inventive device is for optical fibers and comprises a flexible substrate having (a) a central body having an input end; (b) a plurality of tabs extending from a portion of the central body, each tab having at least one means for retaining the optical fibers; (c) a plurality of locking features extending from a second portion of the central body; and (d) a plurality of folding features disposed on the central body. The device is capable of managing, routing, and distributing the optical fibers without the use of an adhesive. In yet another embodiment, the device further comprises a retermination loop.

As stated, one advantage of the present invention is that it does not rely on an adhesive to bond the conductors to a substrate like FLEX-FOIL™ or like U.S. Pat. No. 5,204,925. Instead, the invention relies mainly on features patterned into the substrate that can manage and route the conductors. In this way, the conductors are managed, distributed, and held in place mechanically without bonding them permanently to the substrate. Thus if desired, such as during in a repair or rework step, the conductors can be moved.

Another advantage of the present invention is that the device can be manufactured easily and cost effectively. In brief summary, a roll of flexible substrate is supplied. The device will have a certain desired configuration or design. This configuration can be generated using computer-aided design (CAD). The CAD configuration is inputted into a computer controlled manufacturing machine that converts or patterns the roll of flexible substrate to the desired configuration. In one preferred method, a laser, such as a $CO_2$ laser, patterns the substrate by cutting the desired configuration. One skilled in the art will recognize that the type of laser used to pattern the substrate will depend on the type of substrate chosen.

Yet another advantage of the invention lies in its versatility and ease of use. The device is versatile in that it can be readily patterned and manufactured to accommodate any desired configuration as described above. Because of its flexibility, it can be easily elevated away from the PCB to allow for air-flow over the chips thereby cooling them, if needed. The device can also be designed with a specific layout to avoid particular areas, for example areas on a PCB that may require cooling. It is easy to use in that the optical fibers and connectors can be pre-assembled independent of the PCB and when needed, the assembled device simply plugs into the PCB or its intended destination of use. Finally, the device can be readily reworked if needed.

BRIEF DESCRIPTION OF THE DRAWINGS

The invention can be further described with reference to the following drawings, wherein.

These figures are idealized, not drawn to scale, and are intended merely to be illustrative and non-limiting. In the figures, like reference numbers refer to like parts.

DETAILED DESCRIPTION OF THE INVENTION

The substrate used to fabricate the inventive device can be polymeric or metallic and is preferably flexible. The substrate should have fire resistance and low smoke generation. If polymeric, the substrate should be rated UL 94 V–0 from Underwriters Laboratory, Inc., i.e., it should pass the UL 94V Vertical Burn Test. In general, UL 94 includes standard test methods to test for flammability of plastic materials for parts in devices and appliances.

Illustrative and preferred suitable flexible polymeric materials include high performance specialty films such as KYNAR®, believed to be a multilayered polyvinylidene fluoride (PVDF), commercially available from ATOFINA North America, Philadelphia, Pa. and product information can be found at the www.kynarfilm.com web site. Other commercially available useful materials include TEFLON® (polytetrafluoroethylene, PFTE) and TEDLAR® (polyvinyle fluoride, PVF) both from DuPont Co., Wilmington, Del., KAPTON® and MYLAR®. Yet another useful material is commercially available from GE Plastics, part of the General Electrics Company, Pittsfield, Mass. under product name LEXAN®, including product numbers FR-60, FR-63, FR-65, and FR-66. Teflon derivative materials can also be used.

The device can take on any dimension in the x and y coordinates and its layout is limited only by the imagination of the person designing it. Although the device can have any thickness, it should be of a thickness so as to be flexible. In preferred embodiments, the device is about 0.010 to 0.015 inch thick (0.25 to 0.38 mm).

Figure 1:
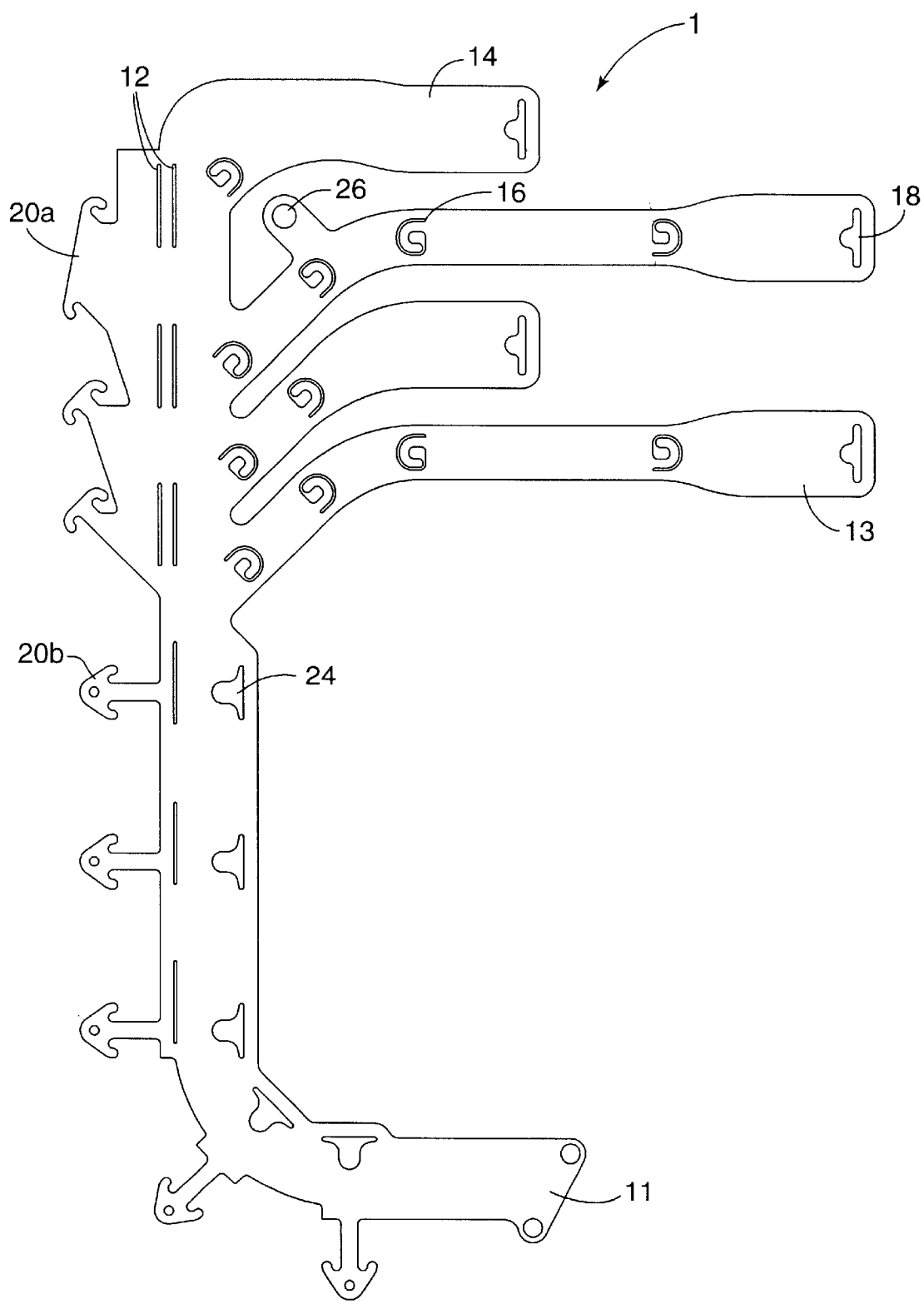
FIG. 1 is a top view of one embodiment in accordance with the present invention.
Figure 4:
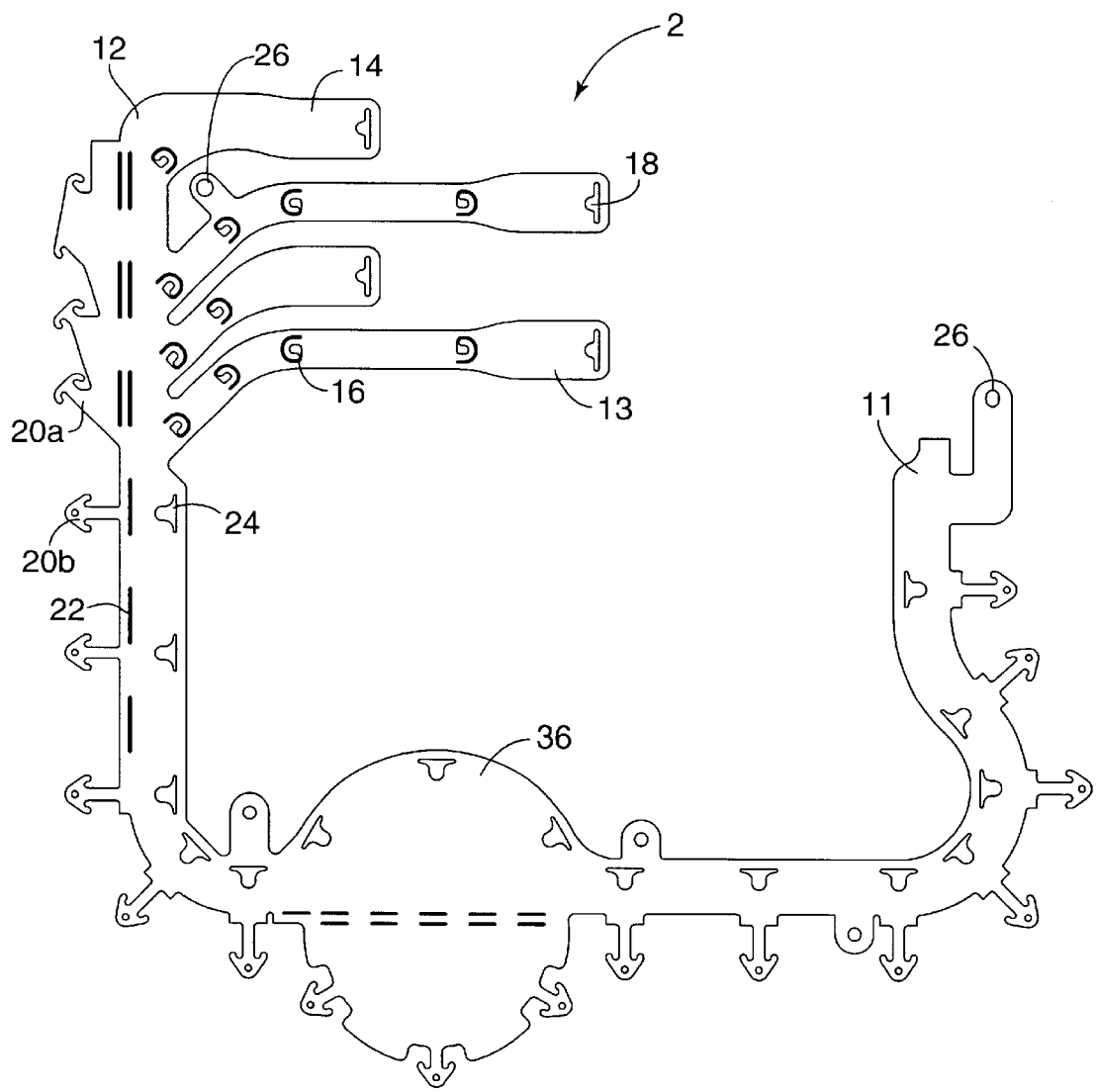
FIG. 4 is a top view of another embodiment in accordance with the present invention.

FIG. 1 shows one embodiment of the invention. Device 10 has a central body 12, a plurality of tabs 14 extending from a first side of the central tab and a plurality of locking features 20 extending from a second side, which is opposite the first side, of the central body. The central body has input end 11, a plurality of folding means 22, and optionally a plurality of interlock slots 24. FIG. 1 shows two types of locking features 20a and 20b. Locking features 20a are designed so as to mate and be retained by the tabs, which have been spaced appropriate to serve this function. Locking features 20b have been designed to mate and to be retained by interlocking slots 24, both of which are optional features. One skilled in the art will recognize that there are different designs that can be used for the locking features and the interlocking slots. Each tab has at least one means 16 for retaining conductors (not shown). Each tab has a distal end 13 where at least one slot 18 provides a means for attaching components such as optical components. The tabs can, and are preferably, of different lengths. When the tabs are configured so as to alternate between a first length and a second length, the configuration allows for efficient placement of optical components. If desired, the tabs or any part of the device can be labeled with information. Optional mounting eyelets 26 allow for quick and easy mounting to a substrate, such as a printed circuit board (PCB). Various types of fasteners can be used to hold the device in place via the mounting eyelets. For example, screws or bolts can be used. Although FIGS. 1 and 4, shown below, show one input end and a plurality of tabs, it is within the scope of the present invention to have a device that has at least one input end and at least one tab. Thus, it is possible to have a device with multiple inputs and yet only one tab and vice-versa, or just one input end and one output end.

Figure 2:
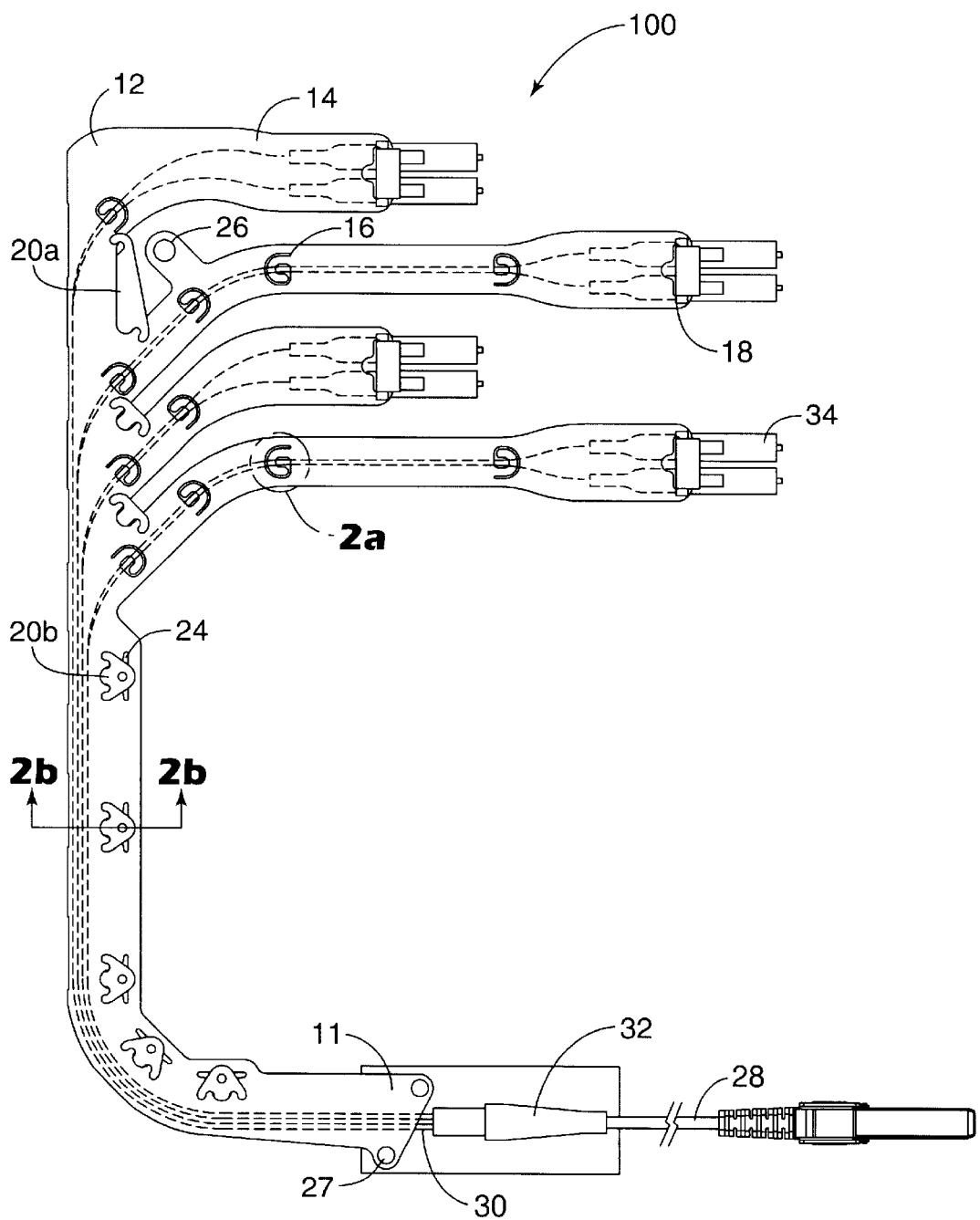
FIG. 2 is a top view of the embodiment of FIG. 1 assembled and containing optical components.
Figure 2A:
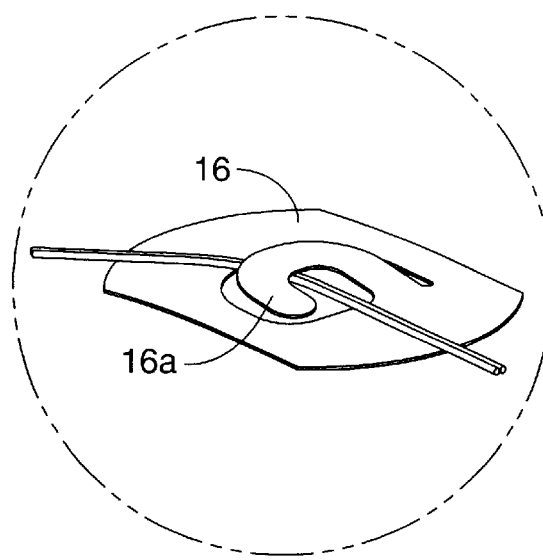
FIG. 2a is an auxiliary isometric view and FIG. 2b is a cross section view of various features.
Figure 2B:
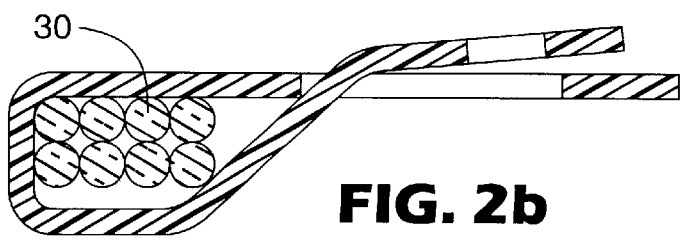

FIG. 2 shows a schematic illustration device 100, which is the device of FIG. 1 after it has been assembled. In this case, a passageway has been formed in the device by folding the central member along the folding means (no longer shown) such that locking features 20a are mated and retained between the plurality of tabs and locking features 20b are mated and retained in the interlock slots. Conductor path 28, preferably fiber optic cables, can be adapted to optical component 32 and individual conduct paths 30, preferably individual optical fibers, enter the device at input end 11. The device has several guide holes 27 for securing it to a substrate. The guide holes serve a similar function to the mounting eyelets 26. The optical fibers eventually reside in at least a portion of the passageway that, by its layout, manages and routes the optical fibers along a desired path. The optical fibers are distributed to various tabs and are retained by means 16. FIG. 2a shows an expanded view of a particular means 16a, generally a hooked feature, for holding one conductor path 30. Each tab has a distal end with a slot 18 upon which an optical device 34 has been mounted. In one preferred embodiment, the optical fibers do not extend beyond the tab but instead are terminated at the optical components. FIG. 2b shows placement of the eight optical fibers 30 inside the passageway, as two rows, each having four fibers.

Figure 3:
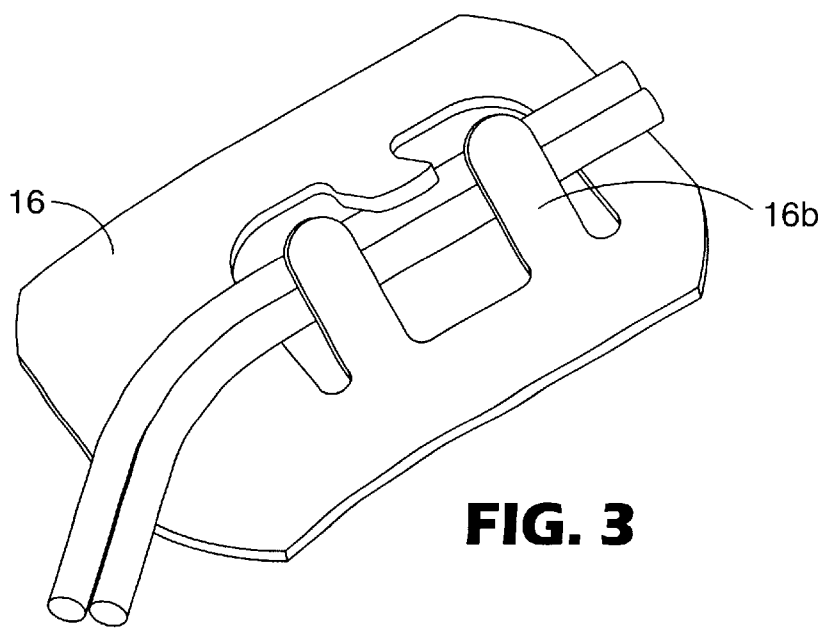
FIG. 3 is an isometric view of another hooking feature in accordance with the present invention.

FIG. 3 shows an alternative embodiment for retaining the conductors. Conductors 30 are retained by finger like elements 16b. One skilled in the art will recognize that other designs can be used to retain the conductors mechanically. It is preferred, however, to design the retaining means so as to be easy to manufacture, easy to use with the conductors, and retains and hold the conductors in place but yet allow for movement, such as sliding, of the optical fibers when desired, such as e.g., when the device with conductors mounted thereon need to be repaired or reworked.

FIG. 4 shows another embodiment of the invention. Device 2 is similar to device 1 of FIG. 1 but further includes a retermination loop 36 extending from central body 12. Locking means 20b, interlocking slots 24, and folding features 22 have been formed on the retermination loop.

Figure 5:
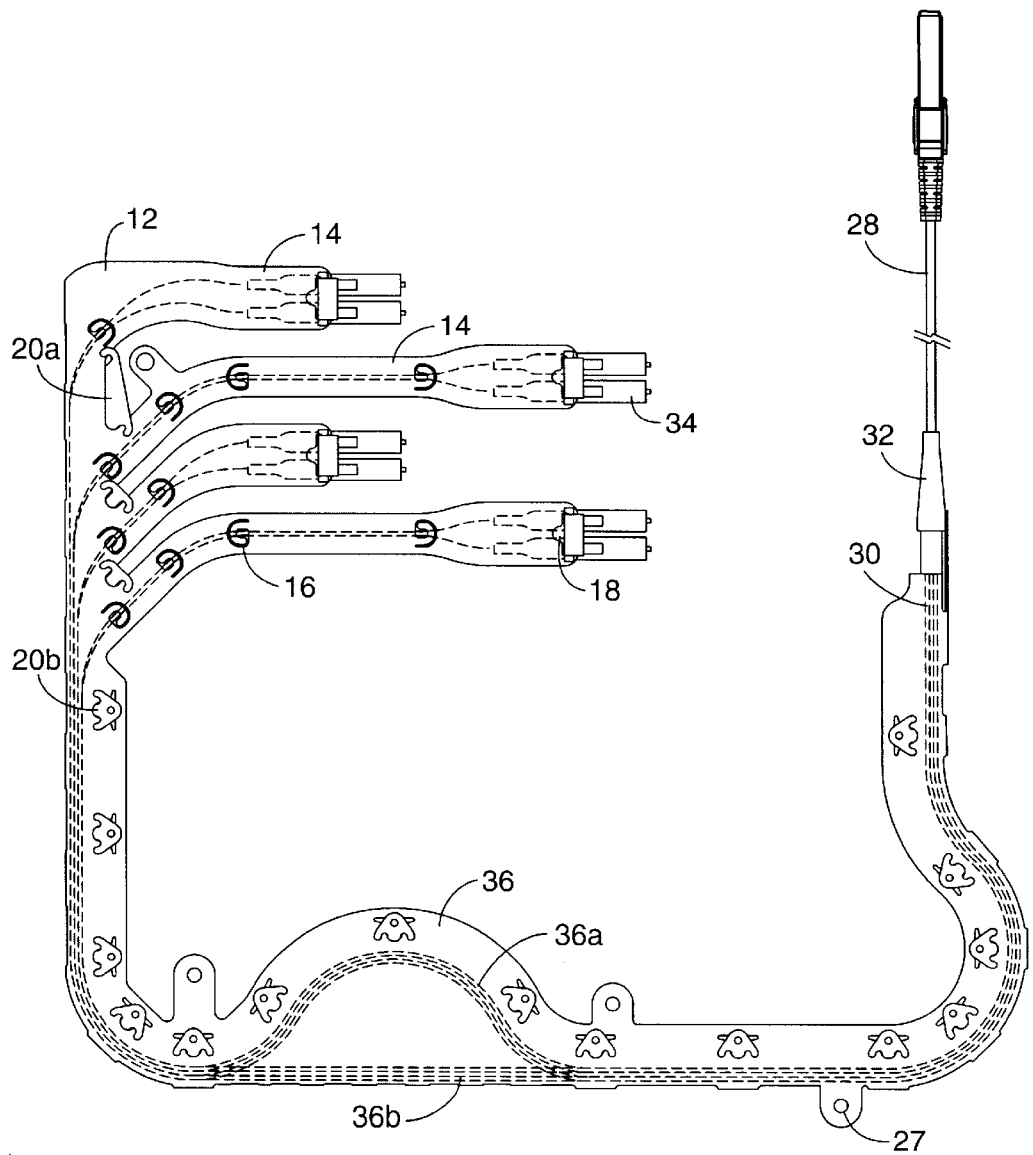
FIG. 5 is a top view of the embodiment of FIG. 4 assembled and containing optical components.

FIG. 5 shows a schematic illustration device 200, which is the device of FIG. 4 after it has been assembled. Like device 100 of FIG. 2, a passageway has been formed in the device by folding the central member along the folding means (no longer shown) such that locking features 20a are mated and retained between the plurality of tabs and locking features 20b are mated and retained in the interlock slots. Retermination loop 36 has also been assembled. Four conductors 30, preferably optical fibers, take a short path 36a while the other four takes the longer path 36b. If desired, all of the conductors can take the long path. One of the key advantages of the retermination loop is that when the long path is used, the conductor path has excess length so that should repair or rework is needed that requires additional length, the fiber or wire can be moved from the long path to the short path. And, because the conductors are managed and routed in the device without the use of an adhesive, they are free to move when desired and yet remain stationary once assembled in the intended application.

Yet another embodiment of the invention has a central body having an input end. A plurality of primary tabs extend from the central body. A plurality of secondary tabs extend from the primary tabs. As analogy, this particular embodiment would appear visually to resemble a tree with multiple branches. Each one of the primary tabs or secondary tabs may have a distal end configured with a means capable of retaining an optical device. It is possible that some of the primary tabs and some of the secondary tabs will not have such a means.

Throughout the central body and/or the primary tabs and/or the secondary tabs there are plurality of folding slots, a plurality of locking features, and a plurality of interlocking slots. In use, a passageway is formed, typically along the central body, by folding the device along the plurality of folding slots such that the locking features mate with the interlocking slots. The conductors enter the device at the input end of the central body, lie in at least a portion of the passageway, are routed and distributed through the various tabs and terminate at the optical devices. If desired, this particular embodiment can contain a retermination loop.

The inventive device equipped with conductors and components can be stacked on top of one another. Because of its flexibility, the device can be lifted out of the plane parallel to the horizontal plane of the PCB at desired location to allow for air -cooling of the electrical components on the PCB.

In yet another embodiment, the device further includes elevating features, such as a formed legs or formed dimples that serve the purpose of elevating the device from the surface of the PCB in a particular area thus allowing for cooling of the electrical components that may be present thereunder. These features can be located anywhere on the device, e.g., along the central body and along the tabs.

As shown in FIGS. 2 and 5, optical components can be attached to the device. These components can be attached to at least one of the following locations: the input end of the central body and at the distal end of the tabs. Preferably, the distal end has been designed to accommodate the optical components. In the preferred embodiments, slots have been designed to the distal end of the tabs for quick and easy installation of the optical components. Also, the terminated end of the optical fibers can easily be plugged into and removed from the optical components. One skilled in the art will appreciate that other designs can be used to attach the optical components.

Useful optical components include, but are not limited to, simplex fiber optic connector, duplex fiber optic connector, parallel fiber optic connector, simplex fusion splint, parallel fusion splint, mechanical splice splint, simplex V-groove (polymeric, ceramic, silica, or silicon), array V-groove, boot, furcation block, shuffle block, and combinations thereof.

As stated, optical fibers are the preferred conductors. Several types of optical fibers that can be used in the present invention. Preferably, the optical fiber is buffered. The term "buffered" as used herein means an optical fiber that has an outer protective coating or housing to minimize mechanical damage. The buffered optical,fiber has a diameter in the range of 250 to 900 micrometers. It is possible to use smaller or larger diameter buffered optical fibers.

As shown in several of the figures, e.g., FIGS. 1 and 4, the inventive device has curvature. One skilled in the art will recognize that in designing the device, the safe minimum bend radius of the optical fiber. For a 250 micrometer buffered optical fiber, the safe minimum bend radius is typically about 1 inch (25.4 mm). For special fibers, the bend radius may be smaller.

Method of Making

One advantage of the present invention is the ease to which it can be manufactured and assembled. In one preferred manufacturing method, a designer creates the layout of the device using computer aided design (CAD) software. The layout is stored in a computer file as CAD data. The computer file interfaces with computer controlled manufacturing machines where the data is translated. In one illustrative example, the machine is a pattern-cutting machine, such as a laser-cutting machine. A sheet of the flexible substrate, or multiple sheets stacked on one another, is fed to the machine and the desired layout, with all of the various features, is cut from the flexible substrate. For a continuous process, the flexible substrate can be supplied in roll form. When a laser-cutting machine is used, the type of laser used will depend on the flexible substrate. For the preferred polymeric materials listed above, a $CO_2$ laser can be used.

Once cut, the device can be easily assembled mechanically either using a machine or by hand. For example, the optical fibers can be positioned on the central body and guided through the retaining means on the tabs. The device can then be folded along the folding features so as to hold the optical fibers. Then optical connectors can be installed. The assembled devices can then be assembled onto the PCB.

What is claimed is:

1. An interconnect device comprising conductors and a flexible substrate, the flexible substrate having:
    (a) a central body having at least one input end where the conductors enter;
    (b) a plurality of primary tabs extending from the central body, each tab having at least one means for retaining the conductors; and
    (c) a passageway formed from folding the device along a plurality of folding slots such that a plurality of locking features mate with a plurality of interlocking slots and the primary tabs, the conductors disposed inside at least a portion of the passageway
        wherein the device manages, routes, and distributes conductors without the use of an adhesive.

2. The interconnect device of claim 1, wherein the conductor is optical fiber.

3. The interconnect device of claim 2 further comprising a plurality of secondary tabs extending from the plurality of primary tabs.

4. The interconnect device of claim 3, wherein at least one of the plurality of primary tabs or at least one of the plurality of secondary tabs has at least one slot at its distal end.

5. The interconnect device of claim 4 further comprising an optical device attached to at least one of the distal end of the primary tabs, the distal end of the secondary tabs, or the input end of the central body.

6. The interconnect device of claim 5 wherein the optical devices are selected from the group consisting of simplex fiber optic connector, duplex fiber optic connector, parallel fiber optic connector, simplex fusion splint, parallel fusion splint, mechanical splice splint, simplex V-groove, array V-groove, boot, furication block, shuffle block, and combinations thereof.

7. The interconnect device of claim 2, wherein the flexible substrate is selected from the group consisting of KYNAR®, TEFLON®, TEDLAR®, KAPTION®, MYLAR®, and LEXAN®.

8. The interconnect device of claim 2, wherein the flexible substrate is rated UL 94 V–0.

9. The interconnect device of claim 2 further comprising a retermination loop extending from at least one of the central body, the plurality of primary tabs, or the plurality of secondary tabs.

10. A device for optical fibers comprising a flexible substrate having
    (a) a central body having an input end;
    (b) a plurality of tabs extending from a portion of the central body, each tab having at least one means for retaining the optical fibers;
    (c) one or more folding features disposed on the central body;
    (d) a plurality of locking features extending from a second portion of the central body, and
    (e) a plurality of slots along the central body opposite the plurality of locking features;
        such that folding the device along the one or more folding feature and mating the locking features with the slots forms a passageway or channel;
        wherein the device is capable of managing, routing, and distributing the optical fibers without the use of an adhesive.

11. The device of claim 10 wherein the flexible substrate is rated UL 94 V–0.

12. The device of claim 10, wherein the flexible substrate is selected from the group consisting of KYNAR®, TEFLON®, TEDLAR®, KAPTION®, and MYLAR®.

13. The device of claim 10, wherein each tab has a distal end that has at least one slot.

14. The device of claim 13 further comprising an optical device attached to at least one of the input end of the central body and the distal end of the tab.

15. The device of claim 14, wherein the optical devices are selected from the group consisting of simplex fiber optic connector, duplex fiber optic connector, parallel fiber optic connector, simplex fusion splint, parallel fusion splint, splice splint, simplex V-groove, array V-groove, boot, furication block, shuffle block, and combinations thereof.

16. The device of claim 10 further comprising mounting eyelets disposed on at least one of the central body or the plurality of tabs.

17. The device of claim 10, wherein the plurality of tabs alternate between a first length and a second length.

18. The device of clam 10, wherein the folding features are slots disposed parallel to the length of the central body.

19. The device of claim 18, wherein the slots of the folding feature have rounded ends.

20. The device of claim 10, wherein the plurality of tabs are spaced so as to be capable of retaining the locking means and wherein the central body further comprises a plurality of interlock slots for retaining the locking means.

21. The device of claim 20 having passageways formed by folding the central body along the plurality of folding features such that the plurality of locking features mates with the plurality of tabs and the interlocking slots.

22. The device of claim 21 further comprising optical fibers disposed in at least a portion of the passageway and in the retaining means of the tabs, wherein the optical fibers enter the device at the input end of the central body and exits the device at the distal end of the tabs.

23. The device of claim 22 further comprising a retermination loop extending from a third portion of the central body.

24. The device of claim 12 further comprising elevating features disposed on at least one of the central body or the plurality of tabs.

25. The interconnect device of claim 2 wherein the device allows for safe minimum bend radius of the optical fiber.

26. The interconnect device of claim 25 wherein the safe minimum bend radius of the optical fiber is about one inch.

* * * * *